United States Patent
Freeman et al.

(10) Patent No.: US 10,890,081 B2
(45) Date of Patent: Jan. 12, 2021

(54) TURBINE DISK WITH PLATFORMS COUPLED TO DISK

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); Aaron D. Sippel, Zionsville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 136 days.

(21) Appl. No.: 15/959,912

(22) Filed: Apr. 23, 2018

(65) Prior Publication Data
US 2019/0323372 A1    Oct. 24, 2019

(51) Int. Cl.
F01D 11/00    (2006.01)
F01D 5/30    (2006.01)
F01D 5/28    (2006.01)

(52) U.S. Cl.
CPC ............ *F01D 11/008* (2013.01); *F01D 5/282* (2013.01); *F01D 5/3007* (2013.01); *F05D 2230/236* (2013.01); *F05D 2230/237* (2013.01); *F05D 2240/24* (2013.01); *F05D 2240/55* (2013.01); *F05D 2240/80* (2013.01); *F05D 2250/75* (2013.01); *F05D 2260/231* (2013.01); *F05D 2300/6033* (2013.01)

(58) Field of Classification Search
CPC .................................................. F01D 11/008
See application file for complete search history.

(56) References Cited

U.S. PATENT DOCUMENTS

| | | | |
|---|---|---|---|
| 3,784,320 A | 1/1974 | Rossmann et al. | |
| 4,019,832 A | 4/1977 | Salemme et al. | |
| 4,169,694 A | 10/1979 | Sanday | |
| 4,471,008 A | 9/1984 | Huther | |
| 4,743,166 A | 5/1988 | Elston, III et al. | |
| 4,802,824 A | 2/1989 | Gastebois et al. | |
| 4,872,812 A * | 10/1989 | Hendley | F01D 5/22 416/190 |
| 5,160,243 A | 11/1992 | Herzner et al. | |
| 5,240,375 A | 8/1993 | Wayte | |
| 5,275,536 A | 1/1994 | Stephens et al. | |
| 5,277,548 A | 1/1994 | Klein et al. | |
| 5,791,877 A | 8/1998 | Stenneler | |
| 5,797,725 A * | 8/1998 | Rhodes | B23P 6/005 415/209.2 |
| 6,132,175 A | 10/2000 | Cai et al. | |
| 6,290,466 B1 | 9/2001 | Ravenhall et al. | |

(Continued)

FOREIGN PATENT DOCUMENTS

GB    618011 A  *  2/1949  ........... F01D 5/3053

*Primary Examiner* — Igor Kershteyn
*Assistant Examiner* — Juan G Flores
(74) *Attorney, Agent, or Firm* — Barnes & Thornburg LLP

(57) ABSTRACT

A disk assembly for use in a turbine of a gas turbine engine. The disk assembly includes a disk and a plurality of platforms coupled with the disk. The disk includes a plurality of radially extending disk lugs that define slots for receiving airfoils. The platforms are coupled to the disk lugs between neighboring blades to block radially inward movement of hot gasses toward the disk.

18 Claims, 3 Drawing Sheets

(56) References Cited

U.S. PATENT DOCUMENTS

| | | |
|---|---|---|
| 6,375,429 B1 | 4/2002 | Halila et al. |
| 6,398,499 B1 | 6/2002 | Simonetti et al. |
| 6,547,526 B2 | 4/2003 | Van Daam et al. |
| 6,619,924 B2 | 9/2003 | Miller |
| 6,632,070 B1 | 10/2003 | Tiemann |
| 6,652,228 B2 | 11/2003 | Tiemann |
| 6,860,722 B2 | 3/2005 | Forrester et al. |
| 7,094,021 B2 | 8/2006 | Haubert |
| 7,326,035 B2 | 2/2008 | Rodrigues et al. |
| 7,874,804 B1 | 1/2011 | Brown |
| 7,878,763 B2 | 2/2011 | Keith et al. |
| 7,931,442 B1 | 4/2011 | Liang |
| 7,972,113 B1 | 7/2011 | Davies |
| 8,016,565 B2 | 9/2011 | Berg et al. |
| 8,257,038 B2 * | 9/2012 | James .................... B22F 5/009 415/215.1 |
| 8,297,931 B2 * | 10/2012 | Read .................... F01D 11/008 416/215 |
| 8,408,874 B2 | 4/2013 | McCaffrey et al. |
| 8,435,007 B2 | 5/2013 | Morrison |
| 8,951,015 B2 | 2/2015 | Brandl et al. |
| 9,239,062 B2 | 1/2016 | Lamboy et al. |
| 9,745,856 B2 | 8/2017 | Uskert et al. |
| 10,287,897 B2 * | 5/2019 | Paige, II ................. F01D 5/284 |
| 2007/0020102 A1 | 1/2007 | Beeck et al. |
| 2007/0048142 A1 | 3/2007 | Dambrine et al. |
| 2009/0016890 A1 | 1/2009 | Douguet et al. |
| 2009/0060745 A1 | 3/2009 | Douguet et al. |
| 2012/0082551 A1 | 4/2012 | Macchia et al. |
| 2016/0290146 A1 * | 10/2016 | Brandl .................... F01D 9/042 |
| 2016/0305260 A1 | 10/2016 | Freeman |

\* cited by examiner

TURBINE DISK WITH PLATFORMS COUPLED TO DISK

FIELD OF THE DISCLOSURE

The present disclosure relates generally to gas turbine engines, and more specifically to rotor wheels having composite platforms.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

The turbine may include turbine wheels having disks and a plurality of blades that extend radially away from the disks. To withstand heat from the combustion products received from the combustor, the blades may be made from ceramic matrix composite materials that are able to interact with the hot combustion products. In some turbine wheels, the disk is made from metallic materials and the disk supports the blades in a gas path leading out of the combustor. Resisting movement of the combustion products moving over the blades in the gas path toward the metallic disks so as to prevent over heating the disk may present design challenges.

SUMMARY

The present disclosure may comprise one or more of the following features and combinations thereof.

A turbine wheel for a gas turbine engine includes a disk, a plurality of blades, and a platform. The disk includes a body arranged about a central axis and a disk lug that extends radially outward away from the body to define a portion of a first slot and a second slot. Each of the first slot and the second slot extends axially through the disk from a forward side to an aft side of the disk and radially inwardly from an outer diameter of the disk toward the central axis. The plurality of blades may comprise ceramic matrix composite materials. The plurality of blades includes a first blade and a second blade. The first blade includes a root located in the first slot to couple the first blade with the disk and an airfoil that extends radially outwardly away from the root of the first blade. The second blade includes a root located in the second slot to couple the second blade with the disk and an airfoil that extends radially outwardly away from the root of the second blade.

The platform may comprise metallic materials. The platform is coupled to a surface of the disk lug. The platform includes an outer wall that extends circumferentially between the first blade and the second blade to resist hot gases that interact with the airfoils of the first and second blades from radially inward movement into contact with the disk. The outer wall may be spaced apart radially from the disk lug to define an air gap between the outer wall and the disk lug to minimize thermal transfer between the platform and the disk.

In some embodiments, the disk lug is formed to define a lug channel that extends radially into the disk lug toward the central axis. The platform may include a support wall that extends radially inward away from the outer wall so that the platform is T-shaped. At least a portion of the support wall may be located in the lug channel defined by the disk lug.

In some embodiments, the turbine wheel further includes one of a braze layer, a diffusion braze layer, and a diffusion bond located between the support wall of the platform and the disk lug to couple the platform with the disk lug. In some embodiments, the turbine wheel further includes a bi-cast clip located between the platform and the disk lug.

In some embodiments, the disk lug is formed to include cutouts that open into the lug channel. The support wall included in the platform may be formed to include cutouts that extend into the support wall. The bi-cast clip may be located in the cutouts formed in the disk lug and the support wall.

In some embodiments, the platform may include an inner wall spaced apart from the outer wall, a first side wall, and a second side wall spaced apart from the first side wall. The first side wall and the second side wall may interconnect the inner wall and the outer wall to define an axially extending air duct through the platform. The inner wall may be continuous without any depressions formed therein and the inner wall may be coupled to the disk lug.

In some embodiments, the turbine wheel may further include one of a braze layer, diffusion braze layer, and diffusion bond located between the inner wall and the disk lug to couple the platform with the disk lug.

In some embodiments, the platform includes a first side wall and a second side wall spaced apart circumferentially from the first side wall. The first side wall may extend radially inwardly away from the outer wall into the first slot. The second side wall may extend radially inwardly away from the outer wall into the second slot to couple the platform to the disk lug.

According to another aspect of the present disclosure, a disk assembly includes a disk and a platform. The disk includes a body arranged about a central axis and a disk lug that extends radially outward away from the body to define a portion of a first slot and a portion of a second slot. The platform may be coupled to a surface of the disk lug. The platform includes an outer wall that extends circumferentially between the first slot and the second slot. The outer wall may be spaced apart radially from the disk lug to define an air gap between the outer wall and the disk lug.

In some embodiments, the disk lug is formed to define a lug channel that extends radially into the disk lug toward the central axis. The platform may include a support wall that extends radially inward from the outer wall and at least a portion of the support wall may be located in the lug channel defined by the disk lug.

In some embodiments, the disk assembly includes one of a braze layer, a diffusion braze layer, and a diffusion bond located between the support wall of the platform and the disk lug to couple the platform with the disk lug. In some embodiments, the disk assembly includes a bi-cast clip located between the platform and the disk lug.

In some embodiments, the disk lug may be formed to include cutouts that open into the lug channel. The support wall included in the platform may be formed to include cutouts that extend into the support wall. A clip may be located in the cutouts formed in the lug channel and the cutouts formed in the support wall.

In some embodiments, the platform includes an inner wall spaced apart from the outer wall, a first side wall, and a second side wall spaced apart from the first side wall. The first side wall and the second side wall may interconnect the inner wall and the outer wall to define an axially extending air duct through the platform. The inner wall may be coupled to the disk lug.

In some embodiments, the inner wall is continuous without any indentations. In some embodiments, the disk assembly includes one of a braze layer, diffusion braze layer, and diffusion bond located between the inner wall and the disk lug to couple the platform with the disk lug.

In some embodiments, the platform includes a first side wall and a second side wall spaced apart circumferentially from the first side wall. The first side wall and the second side wall extend radially inwardly away from the outer wall. The first side wall may extend into the first slot and the second side wall may extend into the second slot to couple the platform to the disk lug.

According to another aspect of the present disclosure, a method may include a number of steps. The method may include providing a disk and a platform, the disk includes a body arranged about a central axis and a disk lug that extends radially outward away from the body to define a portion of a first slot and a portion of a second slot, and coupling the platform to a surface of the disk lug for movement with the disk lug so that an outer wall of the platform is spaced apart radially from the disk lug to form an air gap therebetween.

In some embodiments, the method further includes at least one of brazing, diffusion brazing, and diffusion bonding the platform with the disk lug. In some embodiments, the method further includes conducting a flow of cooling air into the air gap.

These and other features of the present disclosure will become more apparent from the following description of the illustrative embodiments.

DETAILED DESCRIPTION OF THE DRAWINGS

Figure 1:
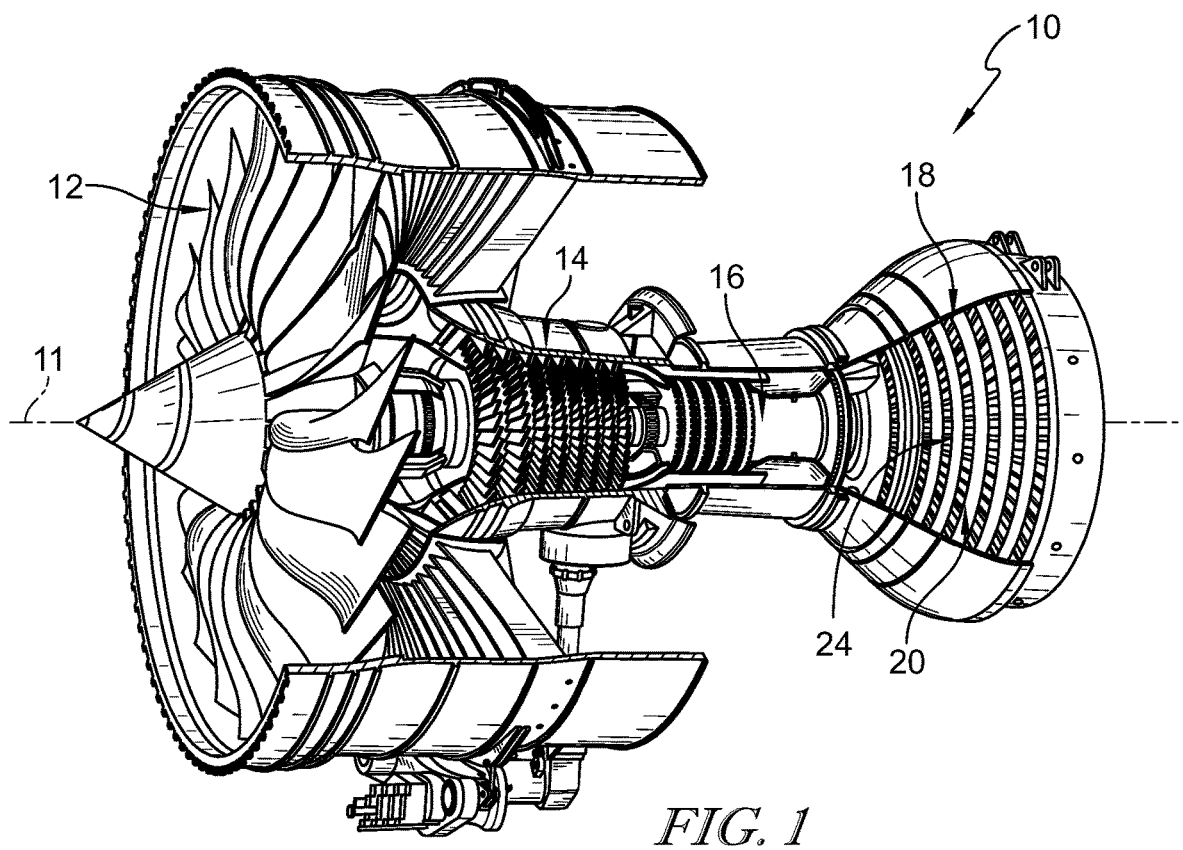
FIG. 1 is cutaway view of a gas turbine engine that includes a fan, a compressor, a combustor, and a turbine and the turbine includes a plurality of turbine wheels in accordance with the present disclosure and shown with further details in FIGS. 2 and 3.

For the purposes of promoting an understanding of the principles of the disclosure, reference will now be made to a number of illustrative embodiments illustrated in the drawings and specific language will be used to describe the same.

Figure 2:
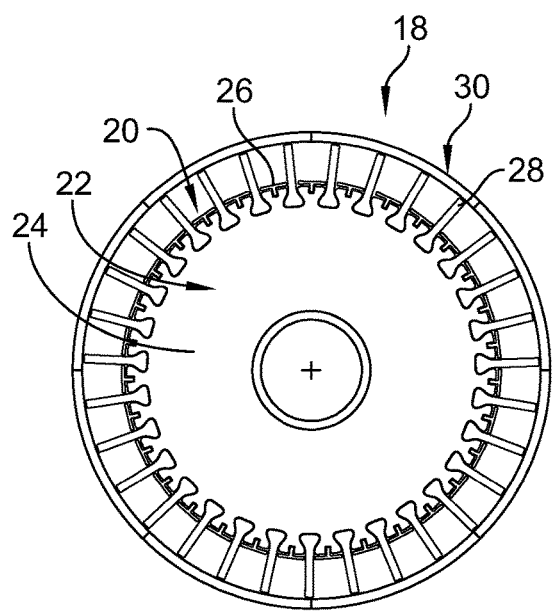
FIG. 2 is an elevation view of the turbine of the gas turbine engine of FIG. 1 showing one of the turbine wheels and a shroud arranged around the turbine wheel.
Figure 3:
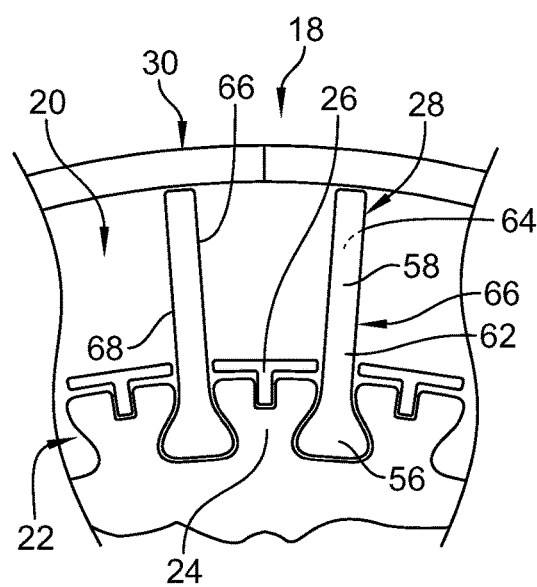
FIG. 3 is an enlarged view of a portion of the turbine of FIG. 2 showing that the turbine wheel includes a disk, a plurality of platforms, and a plurality of blades that are independent of the platforms, the disk having a plurality of disk lugs that define a plurality of slots, the plurality of blades are received in slots formed in the disk, and the platforms are coupled to the disk between neighboring blades.

A turbine wheel 20 in accordance with the present disclosure is shown in FIGS. 2 and 3 and is adapted for use in an illustrative gas turbine 10 as suggested in FIG. 1. As show in FIGS. 2 and 3, the turbine wheel 20 includes a disk 24, a plurality of platforms 26 coupled with the disk 24 for movement therewith, and a plurality of turbine blades 28 that extend radially outward away from the disk 24. The platforms 26 are distinct and independent of the turbine blades 28. The independent platforms 26 and the disk 24 are coupled together and cooperate to define a disk assembly 22. In contrast, traditional turbine wheels may include platforms that are coupled with or formed integrally with the blades.

The gas turbine engine 10 is designed to include the turbine wheel 20 and includes a fan 12, a compressor 14, a combustor 16, and a turbine 18 as shown in FIG. 1. The compressor 14 compresses and delivers air to the combustor 16. The combustor 16 mixes fuel with the compressed air received from the compressor 14 and ignites the fuel. The hot, high-pressure gasses from the burning fuel are directed into the turbine 18 where the turbine blades 28 of the turbine 18 extract work to drive the compressor 14 and the fan 12. In other embodiments, the gas turbine engine 10 may include a shaft, turboprop, or gearbox in place of fan 12.

In the illustrative embodiment, the turbine 18 includes a plurality of the turbine wheels 20 and a turbine shroud 30 arranged around the turbine wheels 20 as suggested in FIGS. 1-3. Each turbine wheel 20 is configured to extract work from the hot, high pressure gasses to cause the turbine wheel 20 to rotate about a central axis 11 of the gas turbine engine 10 during operation of the gas turbine engine 10 to drive the compressor 14 and the fan 12. The turbine shroud 30 is arranged around the turbine wheels 20 to block the hot, high pressure gasses from flowing over the tips of the turbine blades 28 because work is not extracted from gasses that flow over the blades 28.

Figure 4:
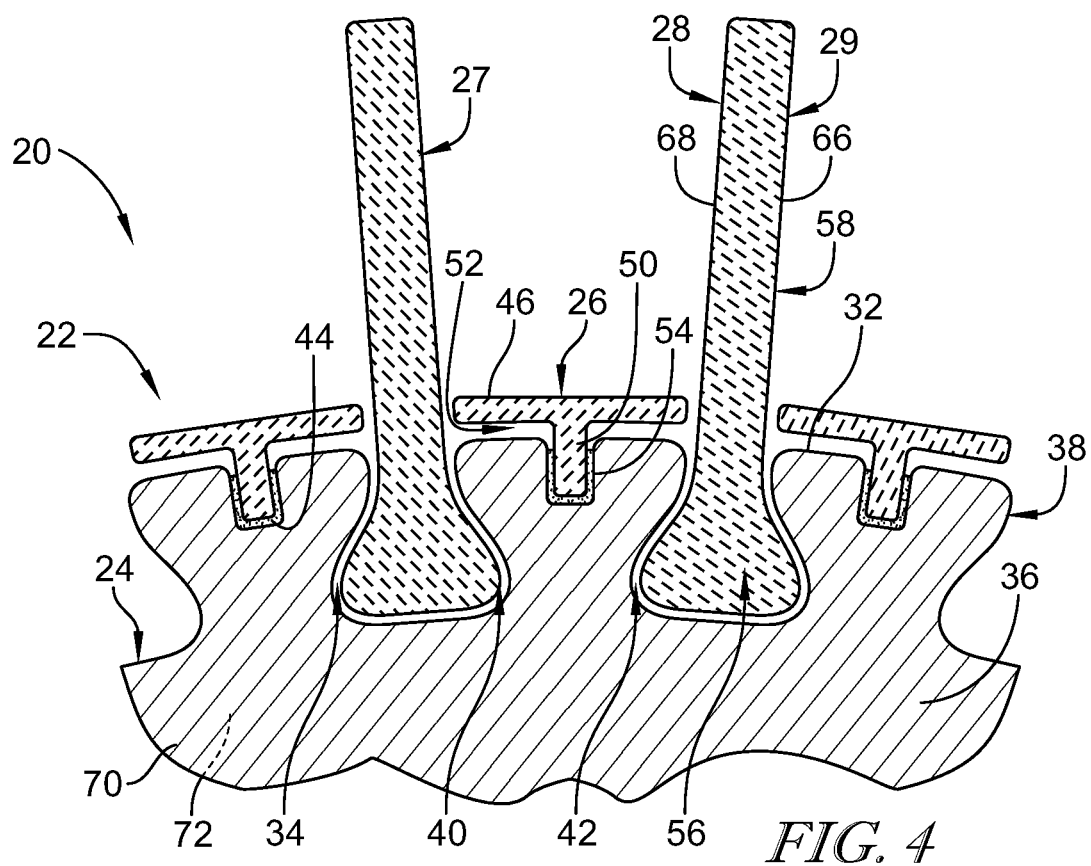
FIG. 4 is a diagrammatic view of a portion of the turbine wheel of FIG. 3 showing that the disk includes the plurality of disk lugs that define dovetail shaped slots that receive the blades and showing that the platforms are T-shaped and brazed with the disk lugs to couple the platforms with the disk.

Each turbine wheel 20 includes the disk assembly 22 and the plurality of blades 28 as shown in FIG. 4. The disk assembly 22 includes the disk 24 and the plurality of platforms 26. The disk 24 is arranged to rotate about the central axis 11 during operation of the gas turbine engine 10. The plurality of blades 28 extend radially away from the disk 24. Each of the plurality of platforms 26 is coupled with the disk 24 for movement with the disk 24 and arranged between neighboring blades 28 to form a portion of a flow path of the hot, high-pressure gasses that resists radially inward movement of the gasses toward the disk 24.

The disk 24 includes a forward side 70, an aft side 72 spaced apart axially from the forward side 70, and an outer diameter 32 that extends between the forward side 70 and the aft side 72 as suggested in FIG. 4. The disk 24 is formed to include the plurality of slots 34 that extend through the disk 24 in a generally axial direction from the forward side 70 to the aft side 72 of the disk 24 and inwardly in a radial direction from the outer diameter 32 of the disk toward the central axis 11. The disk comprises metallic material in the illustrative embodiments.

The disk 24 includes a body 36 and a plurality of disk lugs 38 that extend radially outward away from the body 36 as suggested in FIG. 4. The body 36 may be coupled to a shaft of the gas turbine engine 10 for transmitting power to the compressor 14 or fan 12. Each disk lug 38 is formed to include a lug channel 44 that extends radially inward into the disk lug 38 toward the central axis 11. The lug channel 44 is sized to receive a portion of one of the platforms 26. The body 36 and the plurality of disk lugs 38 cooperate to define the plurality of slots 34 formed in the disk 24.

Each platform 26 is coupled with the disk 24 between neighboring blades 28 to define a flow path around airfoils 58 of the blades 28 as shown in FIG. 4. The platform 26 resists movement of the hot, high-pressure gasses of the turbine 18 toward a root 56 of the blades and minimizes thermal transfer of the hot, high-pressure gasses to the root 56 of the blade 28.

Each platform 26 includes an outer wall 46 and a support wall 50 as shown in FIG. 4. The outer wall 46 extends circumferentially between neighboring blades 28 to resist hot gases that interact with the airfoils 58 of the neighboring blades 28 from radially inward movement into contact with the disk 24. At least a portion of the support wall 50 extends radially inward away from the outer wall 46 into one of the disk lugs 38 to couple the platform 26 with the disk 24. The support wall 50 extends from about a midpoint of the outer wall 46 such that the platform 26 is T-shaped in illustrative embodiments.

The outer wall 46 is spaced apart radially from the disk lug 38 to define an airgap 52 between the outer wall 46 and the disk lug 38. The airgap 52 may minimize thermal transfer between the platform 26 and the disk 24. In some embodiments, pressurized cooling air is conducted into the airgap 52. In other embodiments, the outer wall 46 is not spaced apart radially from the disk lug 38.

The platforms 26 comprise ceramic materials adapted to withstand high temperature combustion gasses. Illustratively, the platform 26 comprises ceramic matrix composite materials. In some embodiments, the platforms 26 are formed from metallic materials. The platform 26 is distinct and independent from the blade 28. The platform 26 and the blade 28 are not substantially co-infiltrated. The blade 28 and platform 26 comprise ceramic material, but are formed separately and are not substantially co-infiltrated with matrix materials.

A braze layer 54 is located between the support wall 50 of the platform 26 and the disk lug 38 to couple the platform 26 with the disk lug 38 as shown in FIG. 4. In other embodiments, a diffusion braze layer or a diffusion bond is located between the support wall 50 and the disk lug 38 to couple the platform 26 with the disk lug 38.

The plurality of blades 28 includes a first blade 27 and a neighboring second blade 29 as shown in FIG. 4. A first slot 40 and a second slot 42 of the plurality of slots 34 formed in the disk 24 are shown in FIG. 4. The first blade 27 is located in the first slot 40 formed in the disk 24 and the second blade 29 is located in the second slot 42 formed in the disk 24. The first and second blades 27, 29 are substantially similar to one another.

Each of the plurality of blades 28 includes a root 56 and an airfoil 58 coupled to the root 56 as shown, for example, in FIG. 4. The root 56 is located in one of the slots 34 to couple the blade 28 with the disk assembly 22. The airfoil 58 extends outwardly away from the root 56 in a radial direction. In the illustrative embodiment, the root 56 and the airfoil 58 are integrally formed to provide a monolithic component.

The airfoil 58 includes a leading edge 62 and a trailing edge 64 spaced axially part from the leading edge 62 relative to the axis 11 as shown in FIG. 3. The airfoil 58 further includes a pressure side 66 and a suction side 68 spaced apart from the pressure side 66 as shown in FIG. 4. The pressure side 66 and the suction side 68 extend between and interconnect the leading edge 62 and the trailing edge 64. The leading edge 62, trailing edge 64, pressure side 66, and suction side 68 extend continuously to mate with the root 56. The blades 28 are distinct and separate from the platforms 26 as shown in FIG. 4 which allows the pressure side 66 and the suction side 68 of the airfoil 58 to join with the root 56 such that no portion of the blade 28 extends circumferentially or axially outward away from the root 56 in the illustrative embodiments.

The blades 28 comprise ceramic materials adapted to withstand the high temperature combustion gasses surrounding the blade 28. Illustratively, the blades 28 comprise ceramic matrix composite materials. In some embodiments, the blades 28 are formed from metallic materials.

A method in accordance with the present disclosure includes a number of steps. The method includes providing the disk 24 and one of the platforms 26 and coupling the platform 26 to a surface of the disk lug 38 for movement with the disk lug 38. The platform 26 may be coupled to the disk lug 38 so that the outer wall 46 of the platform 26 is spaced apart radially from the disk lug 38 to form the air gap 52 therebetween. The method may further include at least one of brazing, diffusion brazing, and diffusion bonding the platform 26 with the disk lug 38. The method may further include conducting a flow of cooling air into the air gap 52.

Figure 5:
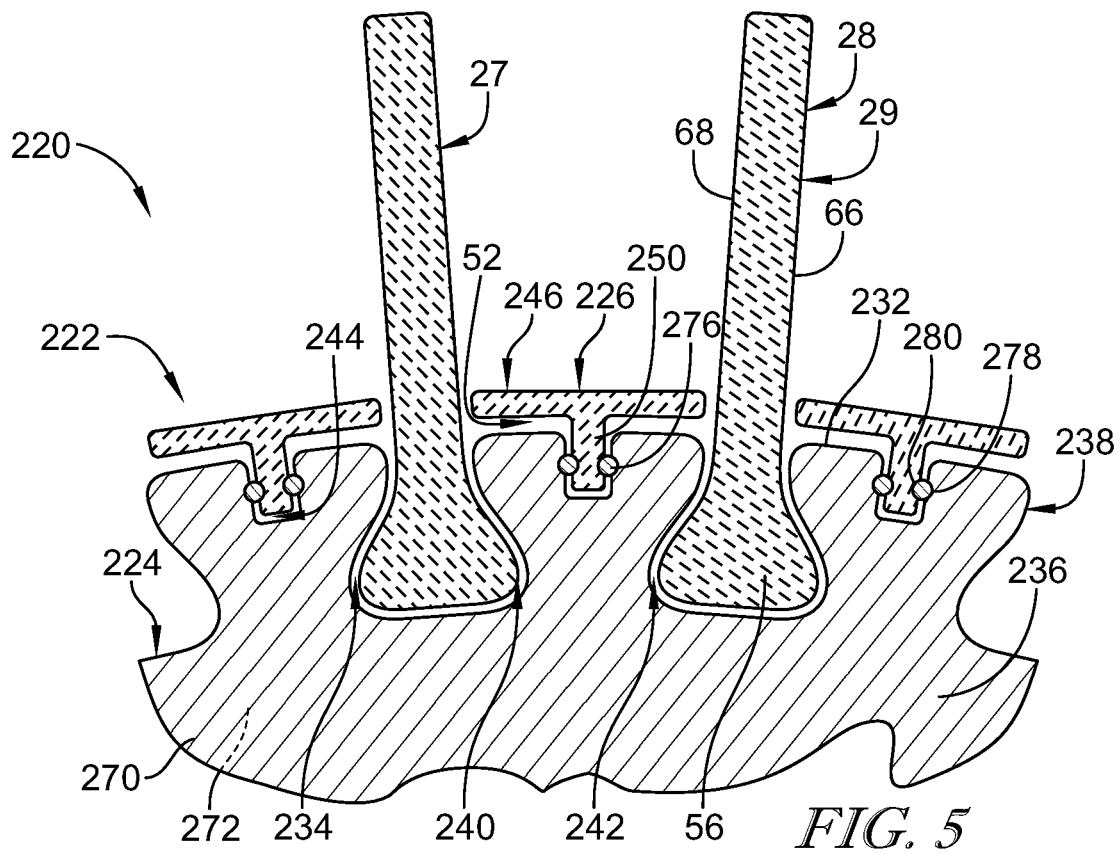
FIG. 5 is a diagrammatic view of a turbine wheel for use with the gas turbine engine of FIG. 1 showing that the turbine wheel includes a disk having a plurality of disk lugs, a plurality of blades received in slots defined between the disk lugs, and T-shaped platforms coupled to each disk lug via a bi-cast clip located between each platform and disk lug.

Another embodiment of a turbine wheel 220 in accordance with the present disclosure is shown in FIG. 5. The turbine wheel 220 is substantially similar to the turbine wheel 220 shown in FIGS. 1-4 and described herein. Accordingly, similar reference numbers in the 200 series indicate features that are common between the turbine wheel 20 and the turbine wheel 220. The description of the turbine wheel 20 is incorporated by reference to apply to the turbine wheel 220, except in instances when it conflicts with the specific description and the drawings of the turbine wheel 220.

The turbine wheel 220 includes the plurality of blades 28 and a disk assembly 222 that includes a disk 224, platforms 226, and bi-cast clips 276 as shown in FIG. 5. The bi-cast clips 276 are located between disk lugs 238 included in the disk 224 and the platforms 226 to couple the platforms with the disk 224. The disk lugs 238 included in the disk 224 are formed to include cutouts 278 that open into the lug channels 244. The support walls 250 included in the platforms 228 are formed to include cutouts 280 that extend into the support walls 250. The bi-cast clips 276 are located in the cutouts 278, 280 formed in the disk lugs 238 and the support walls 250.

Figure 6:
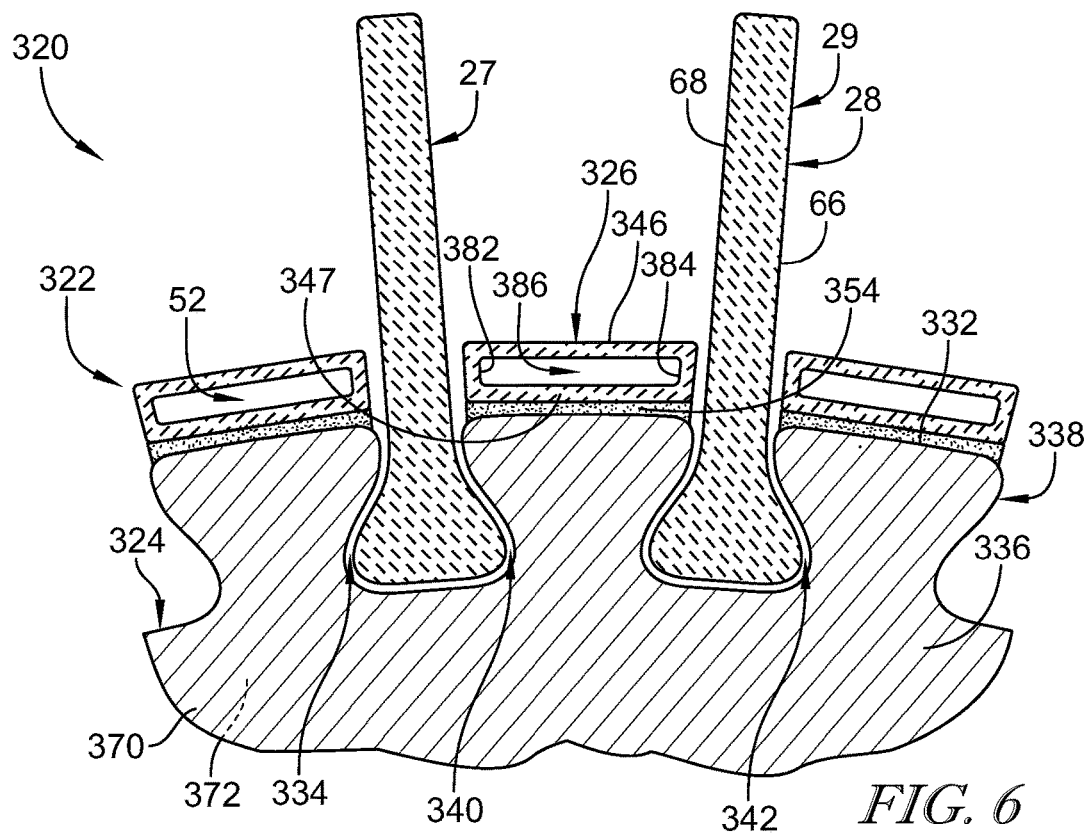
FIG. 6 is a diagrammatic view of a turbine wheel for use with the gas turbine engine of FIG. 1 showing that the turbine wheel includes a disk having a plurality of disk lugs, a plurality of blades received in slots defined between the disk lugs, and a plurality of platforms formed to include a cooling passage that extends therethrough and each platform is coupled to a disk lug.

Another embodiment of a turbine wheel 320 in accordance with the present disclosure is shown in FIG. 6. The turbine wheel 320 is substantially similar to the turbine wheel 320 shown in FIGS. 1-4 and described herein. Accordingly, similar reference numbers in the 300 series indicate features that are common between the turbine wheel 20 and the turbine wheel 320. The description of the turbine wheel 20 is incorporated by reference to apply to the turbine wheel 320, except in instances when it conflicts with the specific description and the drawings of the turbine wheel 320.

The turbine wheel 320 includes the plurality of blades 28 and a disk assembly 322 that includes a disk 324 and platforms 326 as shown in FIG. 6. The disk 324 includes a body 336 and a plurality of disk lugs 338 that extend radially outward away from the body 336 to define slots 334. The disk lugs 338 are not formed to include lug channels 44 in the illustrative embodiment.

The platforms 326 are formed like a conduit in the illustrative embodiment as shown in FIG. 6. The platforms 326 each include an outer wall 346, an inner wall 347 spaced apart from the outer wall 346, a first side wall 382, and a second side wall 384 spaced apart from the first side wall 382. The first side wall 382 and the second side 384 wall interconnect the inner wall 347 and the outer wall 346 to define an axially extending air duct 386 through the platform 326. The air duct 386 provides the air gap 52. The inner wall 347 is continuous without any depressions formed therein in the illustrative embodiment.

The inner wall 347 is coupled to the disk lug 338. The disk assembly 324 includes a braze layer 354 located between the inner wall 347 of the platform 326 and the disk lug 338. In other embodiments, the disk assembly 324 includes a diffusion braze layer or a diffusion bond located between the inner wall 347 and the disk lug 338 to couple the platform 326 with the disk lug 338.

Figure 7:
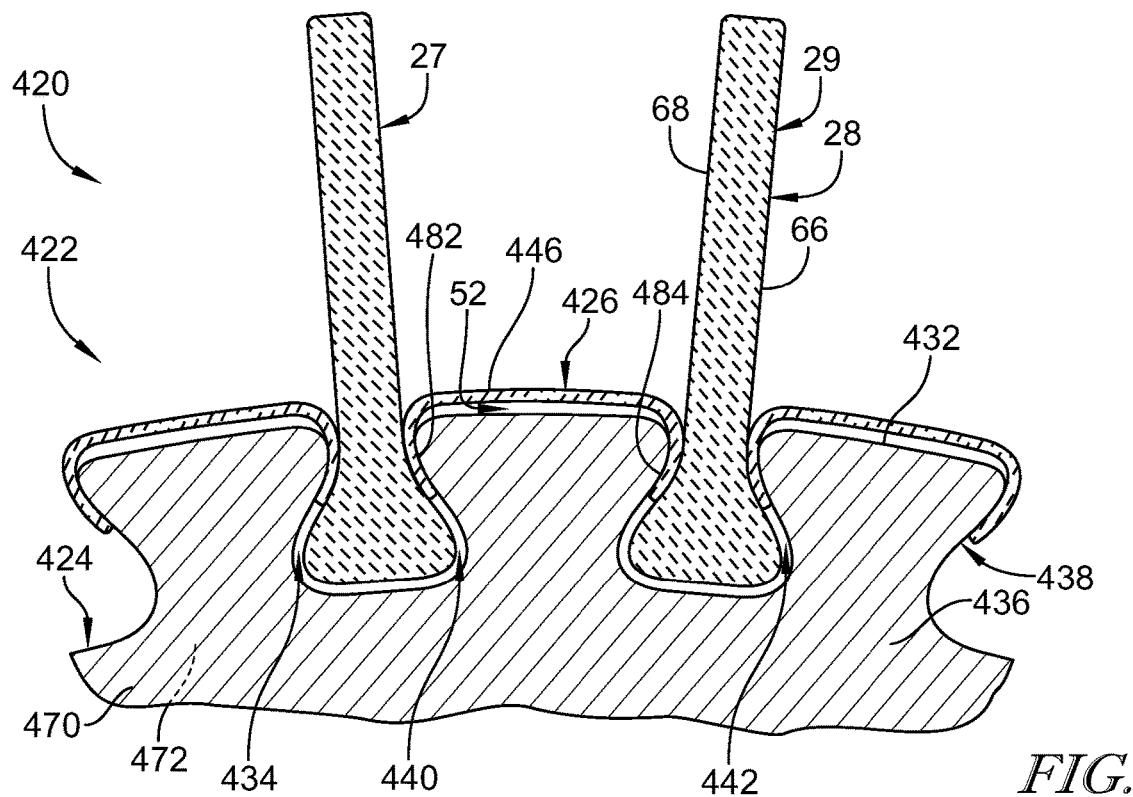
FIG. 7 is a diagrammatic view of a turbine wheel for use with the gas turbine engine of FIG. 1 showing that the turbine wheel includes a disk having a plurality of disk lugs, a plurality of blades received in slots defined between the disk lugs, and a plurality of platforms wherein each platform is arranged around a disk lug to couple the platform with the disk lug.

Another embodiment of a turbine wheel 420 in accordance with the present disclosure is shown in FIG. 7. The turbine wheel 420 is substantially similar to the turbine wheel 20 shown in FIGS. 1-4 and described herein. Accordingly, similar reference numbers in the 400 series indicate features that are common between the turbine wheel 20 and the turbine wheel 420. The description of the turbine wheel 20 is incorporated by reference to apply to the turbine wheel 420, except in instances when it conflicts with the specific description and the drawings of the turbine wheel 420.

The turbine wheel 420 includes the plurality of blades 28 and a disk assembly 422 that includes a disk 424 and platforms 426 as shown in FIG. 7. The disk 424 includes a body 436 and a plurality of disk lugs 438 that extend radially outward away from the body 436 to define slots 434. The disk lugs 438 are not formed to include lug channels 44 in the illustrative embodiment. The slots 434 include a first slot 440 and a second slot 442 as shown in FIG. 7.

The platforms 426 are formed like c-channel in the illustrative embodiment as shown in FIG. 7. The platforms 426 each include an outer wall 446, a first side wall 482, and a second side wall 484 spaced apart circumferentially from the first side wall 482. The first side wall 482 extends radially inwardly away from the outer wall 446 into a first slot 440. The second side wall 484 extends radially inwardly away from the outer wall 446 into the second slot 442 to couple the platform 426 to the disk lug 438. The first side wall 482 and the second side wall 484 are curved and may generally match a contour of the disk lugs 338. The platforms 426 are coupled with the disk lugs 338 such that the outer walls 446 are spaced apart from the disk lugs 338 to form the airgap 52.

Ceramic matrix composite (CMC) materials may sustain higher temperatures than traditional metal alloys. It may desirable to use ceramic matrix composite materials in gas turbine engines where higher fuel efficiencies can be reached with higher temperatures. The turbine section of the engine is experiences high temperatures, so incorporating ceramic matrix composites in the turbine section may provide benefits. As one example, when using ceramic matrix composite turbine blades it may be desirable to remove the platform from the blade to ease manufacturing issues.

The present disclosure provides platforms that are coupled to, bonded to in some embodiments, the disk lug of a turbine wheel. In one embodiment, a platform is shaped like a "T" as shown in FIG. 4. This platform may be fabricated from any type of high temperature super alloy capable of withstanding the requisite temperature. A bottom of the T-shaped platform is inserted into a slot in the top of the disk lug and then brazed, diffusion brazed, or diffusion bonded into the slot in the wheel. This slot could be shaped as a simple groove with vertical sides, have sides with a negative slope so the "T" slips radially into it (platform would have matching contour for slot descriptions), have a dovetail shape that will radially lock the platform in place, or be shaped (such as round or contoured dovetail) that also radially locks the platform in place.

In the embodiment shown in FIG. 4, there is an air gap between the radially inner face of the platform and the outer face of the disk. This air gap may act as an insulator to minimize thermal transfer between the platform and the disk. In addition, the platform may minimize the amount of heat transferred through conduction to the disk lug.

Another embodiment includes a separate platform as in the embodiment show in FIG. 5, but the platform is secured to the disk lug using a bi-cast clip. The platform in this embodiment may comprise metallic, CMC, or monolithic ceramic materials. All other features may be identical to the embodiment shown in FIG. 4.

Another embodiment includes a box section where the bottom of the box is brazed, diffusion brazed, or diffusion bonded to the disk lug as shown in FIG. 6. The air pocket may minimize thermal transfer to and from the flowpath to the disk lug.

Another embodiment includes as a platform that is bonded to the disk at the dovetail attachment faces as shown in FIG. 7. The air pocket may be created again here to minimize thermal transfer to the disk lug. It may allow for larger quantities of blades and smaller disk lugs.

In any embodiment, the air gap or air pocket may be used to seal cooling air. This cooling air could flow from the front to back of the platform thereby cooling the flowpath member by way of convection. Additionally, holes could be machined in the flowpath member to allow cooling air to film out on the surface.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine wheel for a gas turbine engine, the turbine wheel comprising a disk that includes a body arranged about a central axis and a disk lug that extends radially outward away from the body to define a portion of a first slot and a second slot, and each of the first slot and the second slot extends axially through the disk from a forward side to an aft side of the disk and radially inwardly from an outer diameter of the disk toward the central axis, a plurality of blades comprising ceramic matrix composite materials, the plurality of blades includes a first blade and a second blade, the first blade includes a root located in the first slot to couple the first blade with the disk and an airfoil that extends radially outwardly away from the root of the first blade, and the second blade includes a root located in the second slot to couple the second blade with the disk and an airfoil that extends radially outwardly away from the root of the second blade, and a platform comprising metallic materials, the platform coupled to a surface of the disk lug, the platform includes an outer wall that extends circumferentially between the first blade and the second blade to resist hot gases that interact with the airfoils of the first and second blades from radially inward movement into contact with the disk, and the outer wall spaced apart radially from the disk lug to define an air gap between the outer wall and the disk lug to minimize thermal transfer between the platform and the disk, wherein the disk lug is formed to define a lug channel that extends radially into the disk lug toward the central axis, the platform includes a support wall that extends radially inward away from the outer wall so that the platform is T-shaped, and a portion of the support wall is located in the lug channel defined by the disk lug, further comprising a bi-cast clip located between the platform and the disk lug.

2. The turbine wheel of claim 1, wherein the disk lug is formed to include cutouts that open into the lug channel, the support wall included in the platform is formed to include cutouts that extend into the support wall, and the bi-cast clip is located in the cutouts formed in the disk lug and the support wall.

3. The turbine wheel of claim 2, wherein the disk lug includes a first cutout on a first radially extending wall of the lug channel and a second cutout on a second radially extending wall of the lug channel opposite the first radially extending wall, and the support wall of the platform includes a third cutout on a first radially extending face of the support wall and a fourth cutout on a second radially extending face of the support wall opposite the first radially extending face.

4. The turbine wheel of claim 3, wherein the first cutout and the third cutout are radially aligned and a first bi-cast clip is located in a first gap formed therebetween, and the second cutout and the fourth cutout are radially aligned and a second bi-cast clip is located in a second gap formed therebetween.

5. The turbine wheel of claim 1, wherein the lug channel and the support wall are shaped to allow the support wall to be slideably assembled in a radial direction into the lug channel when the platform is not coupled to the disk lug with the bi-cast clips.

6. The turbine wheel of claim 5, wherein the outer wall and the support wall of the platform are integrally formed as a single component.

7. The turbine wheel of claim 1, wherein the lug channel extends axially through the disk lug from a forward side to an aft side of the disk lug.

8. A disk assembly comprising a disk that includes a body arranged about a central axis and a disk lug that extends radially outward away from the body to define a portion of a first slot and a portion of a second slot and a platform coupled to a surface of the disk lug, the platform includes an outer wall that extends circumferentially between the first slot and the second slot, and the outer wall spaced apart radially from the disk lug to define an air gap between the outer wall and the disk lug, wherein the disk lug is formed to define a lug channel that extends radially into the disk lug toward the central axis, the platform includes a support wall that extends radially inward from the outer wall, and a portion of the support wall is located in the lug channel defined by the disk lug, further comprising a bi-cast clip located between the platform and the disk lug.

9. The disk assembly of claim 8, wherein the disk lug is formed to include cutouts that open into the lug channel, the support wall included in the platform is formed to include cutouts that extend into the support wall, and the bi-cast clip is located in the cutouts formed in the lug channel and the cutouts formed in the support wall.

10. The turbine disk assembly of claim 9, wherein a first cutout is formed in a first side of the lug channel and a second cutout is formed in a second side of the lug channel opposite the first side, a third cutout is formed in first side of the support wall and a fourth cutout is formed in a second side of the support wall opposite the first side, and a first bi-cast clip is located between the first cutout and the third cutout and a second bi-cast clip is located between the second cutout and the fourth cutout.

11. The turbine disk assembly of claim 8, wherein the platform comprises ceramic material.

12. The turbine disk assembly of claim 8, wherein the lug channel and the support wall are shaped to allow the support wall to be slideably assembled in a radial direction into the lug channel when the platform is not coupled to the disk lug with the bi-cast clips.

13. The turbine disk assembly of claim 12, wherein the outer wall and the support wall of the platform are integrally formed as a single component.

14. A method comprising providing a disk and a platform, the disk includes a body arranged about a central axis and a disk lug that extends radially outward away from the body to define a portion of a first slot and a portion of a second slot, the disk lug formed to define a lug channel that extends radially into the disk lug toward the central axis, the platform includes an outer wall that extends circumferentially between the first slot and the second slot and a support wall that extends radially inward from the outer wall, inserting the support wall of the platform in a radially inward direction into the lug channel of the disk lug, and coupling the platform to a surface of the disk lug for movement with the disk lug by forming a bi-cast clip between the platform and the disk lug so that the outer wall of the platform is spaced apart radially from the disk lug to form an air gap therebetween.

15. The method of claim 14, further comprising conducting a flow of cooling air into the air gap.

16. The method of claim 14, wherein the outer wall and the support wall of the platform are integrally formed as a single T-shape component.

17. The method of claim 14, further comprising the steps of forming cutouts in the disk lug that open into the lug channel,
forming cutouts in the support wall included in the platform that extend into the support wall, and
inserting the bi-cast clip in the cutouts formed in the lug channel and the cutouts formed in the support wall.

18. The method of claim 14, wherein the platform comprises ceramic material.

\* \* \* \* \*